United States Patent [19]

Heidorn

[11] 3,727,476
[45] Apr. 17, 1973

[54] PULLEY ARRANGEMENT
[75] Inventor: John H. Heidorn, Dayton, Ohio
[73] Assignee: General Motors Corporation, Detroit, Mich.
[22] Filed: Aug. 13, 1971
[21] Appl. No.: 171,643

[52] U.S. Cl..............74/230.17 E, 74/230.17 C, 74/230.17 M
[51] Int. Cl..............................F16h 9/00
[58] Field of Search..............74/230.17 C, 230.17 E, 74/230.17 M

[56] References Cited

UNITED STATES PATENTS

| 2,050,358 | 8/1936 | McElroy et al. | 74/230.17 M |
|---|---|---|---|
| 2,135,348 | 11/1938 | McElroy et al. | 74/230.17 M |
| 2,168,835 | 8/1939 | Wells | 74/230.17 C |
| 2,256,699 | 9/1941 | Almen | 74/230.17 E |
| 2,289,573 | 7/1942 | Almen | 74/230.17 C |
| 2,852,950 | 9/1958 | Uher | 74/230.17 E |
| 2,900,833 | 8/1959 | Wiseman | 74/230.17 C |
| 2,938,395 | 5/1960 | Houorka | 74/230.17 M |
| 3,060,759 | 10/1962 | Van der Brugghew | 74/230.17 C |
| 3,064,486 | 11/1962 | Aplin | 74/230.17 C |

Primary Examiner—C. J. Husar
Attorney—Warren E. Finken et al.

[57] ABSTRACT

The adjustable pulley or speed changer assembly illustrated includes a fixed and movable wall, with the fixed wall being connected at its outer edge to normally bowed resilient spoke members secured to the reciprocally movable shaft to which the movable pulley wall is also secured. As the belt is loaded up, it moves radially inwardly, forcing the movable wall away from the fixed wall, and thereby axially moving the shaft and straightening the normally bowed resilient spoke members, without any sliding fits being involved. As the load on the belt is relieved, the distorted spoke members cause the movable wall to return toward the fixed wall, progressively forcing the belt radially outwardly between the pulley walls. Centrifugal weights secured by flexible arms to the fixed wall abutment, in contact with the movable wall, serve to limit the separating movement of the latter at a predetermined speed.

6 Claims, 3 Drawing Figures

PATENTED APR 17 1973  3,727,476

INVENTOR.
John H. Heidorn
BY
John P. Moran
ATTORNEY

PULLEY ARRANGEMENT

This invention relates generally to pulleys and, more particularly, to adjustable pulley arrangements for speed control.

Variable speed control devices are typically expensive and generally comprise sliding fit arrangements which may be prone to fretting and contamination from dirt particles.

Accordingly, an object of the invention is to provide an improved simplified adjustable pulley arrangement wherein no sliding fits are included.

Another object of the invention is to provide a pulley arrangement wherein one pulley wall is fixed and connected to the radially outer ends of formed resilient spoke members, the latter being secured at their inner ends to a reciprocally movable shaft to which a movable pulley wall is also secured, with the resilient spoke members serving to urge the movable wall toward the fixed wall.

A further object of the invention is to provide additional separately mounted resilient means for cooperation with the resilient pulley wall supporting spoke members, the additional resilient means including a fixed cup-shaped spring retainer and an annularly corrugated spring member secured between the outer edge of the retainer and the reciprocally movable shaft.

A still further object of the invention is to provide centrifugal weight members operatively connected between the fixed and movable pulley walls for limiting the separating movement of the latter at a predetermined speed.

These and other objects and advantages of the invention will become apparent when reference is made to the following description and accompanying drawings, wherein.

Figure 1:
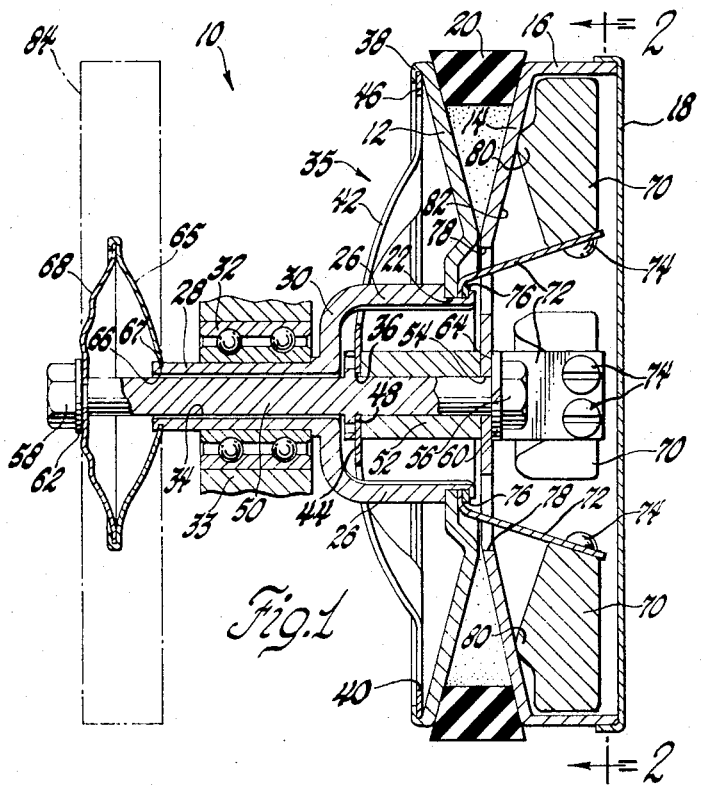
FIG. 1 is a cross-sectional view of a pulley arrangement embodying the invention.
Figure 2:
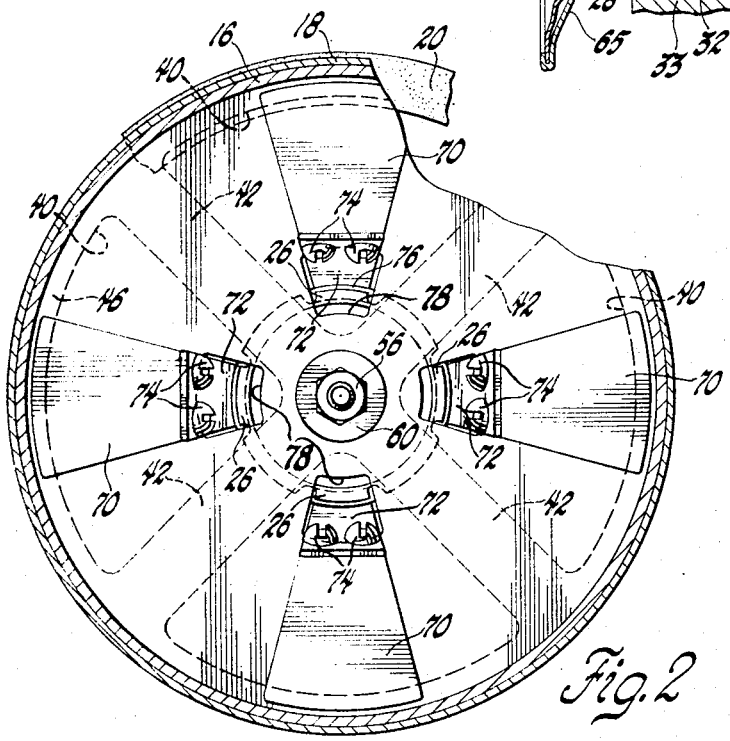
FIG. 2 is a fragmentary cross-sectional view taken along the plane of line 2—2 of FIG. 1, and looking in the direction of the arrows.

Referring now to the drawings in greater detail, FIG. 1 illustrates a speed changer or pulley assembly 10 including a fixed pulley wall 12 and an axially movable or shiftable pulley wall 14. A cylindrical side wall 16 is formed on the outer peripheral edge of the pulley wall 14. A cover member 18 is mounted on the open edge of the cylindrical side wall 16. A belt 20 is mounted intermediate the pulley walls 12 and 14. The pulley wall 12 has a central opening 22 formed therein and is secured at the edge thereof to four (FIG. 2) equally-spaced, axially extending arms 26. A hub or sleeve member 28 extends from radially inturned extensions 30 formed on the arms 26 and is rotatably supported in bearings 32 whose outer race is fixed in an abutment represented generally at 33. An axial passage 34 is formed through the hub member 28.

A thin flexible plate member 35 having a central opening 36 formed therein is secured at its outer peripheral edge to the outer peripheral edge of the fixed pulley wall 12 by any suitable means, such as clamping via a radially inturned beaded edge 38 formed on the outer periphery of the fixed pulley wall 12. The plate member 35 includes four equally-spaced, wedge-shaped cutout portions 40 (FIG. 2), providing four equally-spaced spoke members 42 interconnecting a central hub portion 44 and an outer ring portion 46, the spoke members 42 being formed so as to assume a free-state position such as that illustrated in FIG. 1. It is the outer ring portion 46 which is clamped between a shoulder 48 formed on an axially movable central shaft member 50, and a spacer 52 mounted around the shaft member 50 intermediate the flexible plate member 35 and the inner portion of the movable pulley wall 14, the latter having a central opening 54 formed therethrough for mounting around the central shaft 50. The shaft 50 is of a smaller diameter than that of the passage 34 of the hub member 28 and extends axially therethrough. Nuts 56 and 58, having respective flanges or collars 60 and 62 formed thereon, are threadedly mounted on the respective extended threaded ends of the central shaft 50. The inner face 64 of the flange 60 abuts against the inner edge of the movable pulley wall 14 and clamps the wall 14 and plate member 35 on opposite ends of the spacer 52 for rotation with the central shaft 50.

A saucer-shaped spring retainer 65 having a central opening 66 formed therein is mounted at its radially inner edge in an annular groove 67 formed adjacent the free end of the sleeve member 28. A resilient member, such as an annularly corrugated metal disc 68, is secured between the outer edge of the spring retainer 65 and the flange 62 of the nut 58, the disc-like spring member 68 serving to retain the central shaft 50 on center and urging the shaft 50 to the left in FIG. 1, supplementing the force of the resilient spoke members 42 of the flexible plate member 35.

If desired for particular applications, four centrifugally-actuated weight members 70 may be positioned adjacent the movable pulley wall 14 within the cylindrical side wall 16 and the end cover 18. The weight members 70 are mounted on and secured to the end portions of resilient straps or arms 72 by screws 74, with the other ends of the resilient arms 72 secured to the ends of the axially extending arms 26 adjacent the inner edge of the fixed pulley wall 12, and retained thereon by retainer rings 76. The resilient arms 72 extend through openings 78 formed in the movable pulley wall 14. The weight members 70 are axially aligned with the respective cutout portions 40 of the flexible plate members 35. A projection 80 is formed on each weight member 70 for sliding contact with the outer face 82 of the movable pulley wall 14.

If desired, in lieu of the spring member 68 and the adjacent retainers 65, a second pulley assembly, represented generally in FIG. 1 at 84, including fixed and movable walls and a flexible plate member, substantially the same as members 12, 14, and 35, may be mounted on the left end (FIG. 1) of the central shaft 50 for a two-stage variable ratio application.

Figure 3:
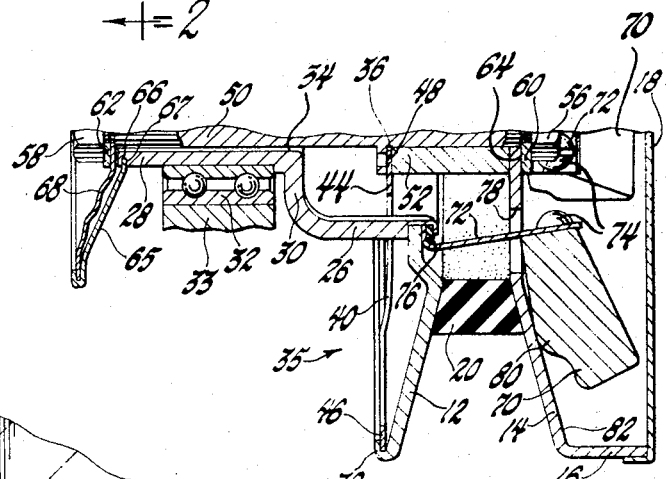
FIG. 3 is a fragmentary cross-sectional view of the FIG. 1 structure in a different operational position.

As indicated above, the spoke members 42 of the flexible plate 35 are formed so as to assume a free-state position, such as that illustrated in FIG. 1, with the belt 20 correspondingly assuming a radially outward position between the pulley walls 12 and 14. In response to the loading of the belt 20 for any reason, the belt 20 is forced radially inwardly between the pulley walls 12 and 14, reducing the diameter thereof across the central shaft 50 (FIG. 3). As the belt 20 moves radially inwardly, it forces the pulley wall 14 to the right (FIG. 3), pulling the formed resilient spoke members 42 to the right via the collar 60 of the nut 56, the spacer member 52 and the shoulder 48, against the force of the spoke members' normally leftwardly extended position illustrated in FIG. 1. This causes the central shaft 50 to move through the larger diameter axial opening 34 of the sleeve member 28 without making any substantial contact therewith to the position illustrated in FIG. 3. Such action will also move the annular spring member 68 toward the saucer-shaped retainer 65, as also illustrated in FIG. 3.

As the load on the belt 20 is relieved, both the spoke members 42 and the annular spring member 68 urge the central shaft 50 and, hence, the movable wall 14 to the left in FIG. 3 until the respective positions illustrated in FIG. 1 are once again attained. This, of course, returns the belt 20 to the radially outer portions of the adjacent pulley walls 12 and 14.

For those applications utilizing the centrifugal weight members 70, the shapes and sizes of the latter members and the length of the resilient arms 72 are selected so as to cooperate with the movable pulley wall 14 to limit the movement thereof at some predetermined maximum speed. The resilient arms 72 assume a longitudinal position substantially parallel (FIG. 3) to the axis of the central shaft 50 until such time as the speed of the pulley 12/14 reaches a predetermined speed by virtue of the belt 20 having been caused to move radially inwardly to spread the movable wall 14 to the right, as illustrated in FIG. 3. Thereafter, the weight members 70 will be caused to move radially outwardly (FIG. 1) under the action of centrifugal force, forcing the movable wall 14 toward the fixed wall 12 to restrain the belt 20 from moving further inwardly, thereby limiting the speed of the pulley 12/14.

The principles of the above-described one- and two-stage pulley assemblies may be utilized in various speed changer applications, including an integrated automobile air conditioning system such as, for example, the system covered by U.S. Pat. No. 3,220,211.

It should be apparent that the invention provides a simplified adjustable pulley arrangement wherein no sliding fits are utilized, thus assuring continued efficiency without fretting or the possibility of contamination of sliding parts by dirt particles.

It should also be apparent that, in particular applications, the central shaft 50 of the pulley assembly 10 could be extended at either of its ends to serve as a driving or driven shaft.

While but two embodiments of the invention have been shown and described, other modifications thereof are possible.

I claim:

1. A pulley arrangement comprising a pulley having an axially fixed pulley wall and an axially movable pulley wall, a reciprocally movable central shaft, a sleeve member loosely surrounding said central shaft, bearing means axially retaining and rotatably supporting said sleeve member, said movable pulley wall being secured at its inner periphery to said central shaft, and a plurality of spaced resilient spoke members secured at their radially inner ends to said central shaft, said fixed pulley wall being suspended at its outer periphery on the radially outer ends of said plurality of spaced resilient spoke members and secured at its inner end to said sleeve member, said resilient spoke members being distorted radially inwardly of said outer ends thereof in response to axial movement of said movable wall and said central shaft relative to said sleeve member.

2. A pulley arrangement comprising a pulley having an axially fixed pulley wall and an axially movable pulley wall, a reciprocally movable central shaft, a sleeve member loosely surrounding said central shaft, bearing means axially retaining and rotatably supporting said sleeve member, said movable pulley wall being secured at its inner periphery to one end of said central shaft, a plurality of spaced resilient spoke members secured at their radially inner ends to said central shaft, said fixed pulley wall being suspended at its outer periphery on the radially outer ends of said plurality of spaced resilient spoke members and secured at its inner end to one end of said sleeve member, said resilient spoke members being distorted radially inwardly of said outer ends thereof in response to axial movement of said movable wall and said central shaft relative to said sleeve member, a retainer member secured to the other end of said sleeve member, and resilient means secured between said retainer member and the other end of said central shaft for supplementing the response of said resilient spoke members.

3. A pulley arrangement comprising a pulley having an axially fixed pulley wall and an axially movable pulley wall, a reciprocally movable central shaft, a sleeve member loosely surrounding said central shaft, bearing means mounted around and rotatably supporting said sleeve member, said movable pulley wall being secured at its inner periphery to one end of said central shaft, a plurality of spaced resilient spoke members secured at their radially inner ends to said central shaft, said fixed pulley wall being suspended at its outer periphery on the radially outer ends of said plurality of spaced resilient spoke members and secured at its inner end to one end of said sleeve member, said resilient spoke members being distorted radially inwardly of said outer ends thereof in response to axial movement of said movable wall and said central shaft relative to said sleeve member, a saucer-shaped retainer member having a central opening formed therethrough and secured at its inner periphery to the other end of said sleeve member, and an annularly corrugated resilient disc secured at its outer periphery to the outer periphery of said retainer member and at its central portion to the other end of said central shaft.

4. A pulley arrangement comprising a pulley having an axially fixed pulley wall and an axially movable pulley wall, a reciprocally movable central shaft, a sleeve member loosely surrounding said central shaft, bearing means axially retaining and rotatably supporting said sleeve member, said movable pulley wall being secured at its inner periphery to said central shaft, and a plurality of spaced resilient spoke members secured at their radially inner ends to said central shaft, said fixed pulley wall being suspended at its outer periphery on the radially outer ends of said plurality of spaced resilient spoke members and secured at its inner end to said sleeve member, said resilient spoke members being distorted radially inwardly of said outer ends thereof in response to axial movement of said movable wall and said central shaft relative to said sleeve member, a plurality of equally-spaced openings formed in said movable pulley wall, a plurality of resilient arms secured at one end thereof to said sleeve member and extending through said spaced openings, and a plurality of centrifugal weight members secured to the other ends of said resilient arms adjacent said movable pulley wall for limiting the separating movement of said movable pulley wall at a predetermined maximum speed.

5. A pulley arrangement comprising a belt, a pulley having an axially fixed pulley wall and an axially movable pulley wall, said belt being mounted therebetween, a reciprocally movable central shaft, a hub member having spaced longitudinal slots formed therein and mounted around and spaced apart from said central shaft, the ends of said central shaft extending beyond the ends of said hub member, an axially fixed bearing rotatably supporting said hub member, said movable pulley wall being secured at its inner periphery to one extended end of said central shaft, and a plurality of spaced resilient spoke members extending radially through said spaced longitudinal slots and secured at their radially inner ends to an intermediate point on said central shaft, said fixed pulley wall being secured at its outer periphery to the radially outer ends of said plurality of spaced resilient spoke members and at its inner periphery to said hub member, said resilient spoke members being distorted radially inwardly of said outer ends thereof in response to axial movement of said central shaft through said spaced-apart surrounding hub member as caused by said belt moving radially along said fixed and movable pulley walls under variable load conditions.

6. A pulley arrangement comprising a belt, a pulley having an axially fixed pulley wall and an axially movable pulley wall, said belt being mounted therebetween, a reciprocally movable central shaft, a hub member having spaced longitudinal slots formed therein and mounted around and spaced apart from said central shaft, the ends of said central shaft extending beyond the ends of said hub member, an axially fixed bearing rotatably supporting said hub member, said movable pulley wall being secured at its inner periphery to one extended end of said central shaft, a plurality of spaced resilient spoke members extending radially through said spaced longitudinal slots and secured at their radially inner ends to an intermediate point on said central shaft, said fixed pulley wall being secured at its outer periphery to the radially outer ends of said plurality of spaced resilient spoke members and at its inner periphery to said hub member, said resilient spoke members being distorted radially inwardly of said outer ends thereof in response to axial movement of said central shaft through said spaced-apart surrounding hub member as caused by said belt moving radially along said fixed and movable pulley walls under variable load conditions, a saucer-shaped retainer member having a central opening formed therethrough and secured at its inner periphery to the other end of said sleeve member, and an annularly corrugated resilient disc secured at its outer periphery to the outer periphery of said retainer member and at its central portion to the other end of said central shaft, a plurality of equally-spaced openings formed in said movable pulley wall, a plurality of resilient arms secured at one end thereof to said sleeve member and extending through said spaced openings, and a plurality of centrifugal weight members secured to the other ends of said resilient arms adjacent said movable pulley wall for limiting the separating movement of said movable pulley wall at a predetermined maximum speed.

* * * * *